United States Patent
Ain et al.

(10) Patent No.: US 6,775,274 B1
(45) Date of Patent: Aug. 10, 2004

(54) CIRCUIT AND METHOD FOR PROVIDING SECURE COMMUNICATION OVER DATA COMMUNICATION INTERCONNECTS

(75) Inventors: Jonathan Wade Ain, Tucson, AZ (US); Donald Eugene Denning, Tucson, AZ (US); Robert George Emberty, Tucson, AZ (US); Craig Anthony Klein, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/492,957

(22) Filed: Jan. 27, 2000

(51) Int. Cl.[7] .......................... H04J 3/02; H03M 13/00; H04K 1/00
(52) U.S. Cl. ...................... 370/360; 370/366; 370/389; 380/256; 398/45; 710/71
(58) Field of Search ................................ 370/357, 359, 370/360, 366, 419, 463, 465, 389; 710/52.62, 65.71; 380/255, 256; 398/43, 45, 52, 54, 98, 99, 101; 714/746, 752, 758, 776

(56) References Cited

U.S. PATENT DOCUMENTS

| | | | |
|---|---|---|---|
| 4,310,720 A | * | 1/1982 | Check, Jr. ................ 178/22.08 |
| 4,454,575 A | * | 6/1984 | Bushaw et al. ............ 364/200 |
| 4,497,054 A | * | 1/1985 | Read .......................... 370/58 |
| 5,050,165 A | | 9/1991 | Yoshioka et al. |
| 5,121,396 A | | 6/1992 | Irvin et al. |
| 5,150,401 A | * | 9/1992 | Ashby, III et al. ............ 380/29 |
| 5,347,384 A | | 9/1994 | McReynolds et al. |
| 5,473,715 A | | 12/1995 | Schofield et al. |
| 5,490,007 A | | 2/1996 | Bennett et al. |
| 5,638,518 A | | 6/1997 | Malladi |
| 5,784,387 A | | 7/1998 | Widmer |
| 5,802,080 A | | 9/1998 | Westby |
| 5,861,966 A | | 1/1999 | Ortel |
| 5,910,988 A | | 6/1999 | Ballard |
| 6,064,679 A | * | 5/2000 | Hashemi et al. ............ 370/513 |
| 6,094,532 A | * | 7/2000 | Acton et al. ........... 395/800.28 |
| 6,311,239 B1 | * | 10/2001 | Matthews .................... 710/66 |

* cited by examiner

*Primary Examiner*—Alpus H. Hsu
(74) *Attorney, Agent, or Firm*—Dale M. Crockatt; Dillon & Yudell LLP

(57) ABSTRACT

A secure communication circuit for use with a data communication interconnect adapter and method of operation thereof. The secure communication circuit includes a first data buffer coupled to a data input terminal, an encoder/decoder coupled to the first data buffer, a second data buffer coupled to the encoder/decoder and a switching device coupled to a data output terminal. The switching device is couplable to either the first or second data buffers. A controller, coupled to the (switching device, selectively connects the switching device to the first or second data buffers. In a related embodiment, the secure communication circuit further includes a first serializer/deserializer (SERDES) coupled to the data input and a second SERDES coupled to the switching device.

22 Claims, 4 Drawing Sheets

CIRCUIT AND METHOD FOR PROVIDING SECURE COMMUNICATION OVER DATA COMMUNICATION INTERCONNECTS

BACKGROUND OF THE INVENTION

1. Technical Field of the Invention

The present invention relates generally to data communications and in particular to data communication interconnects. Still more particularly, the present invention relates to a circuit for providing secure communication over data communication interconnects and a method of operation thereof.

2. Description of the Related Art

Transmission of data over a network is generally accomplished in one of three forms; namely multicasting, unicasting or broadcasting. Multicasting is a network of service that provides for efficient delivery of data from a source to multiple recipients, i.e., a network multicast group. In multicasting, typically only one copy of the data will pass over any link in the network and copies of the data will be made only where the paths diverge. Consequently, multicasting reduces sender transmission overhead, bandwidth requirements as well as the latency observed by the recipients. Unicasting on the other hand, provides for delivery of data from a source to only one recipient. The third form of network transmission, i.e., broadcasting, involves transmitting data from a source to every recipient that is connected to the network.

The emergence of electronic network systems, such as the Internet, as forums for a wide variety of transactions and communications has highlighted the need for secure data transfer. These network systems are highly vulnerable to an uninvited "guest" who may have an interest in a private communication or transaction and may attempt to intercept the contents of the communication or transaction.

Communications and transaction security begins with authentication and encryption. Encryption involves encoding data to an unreadable form to ensure privacy between a sender and recipient. Cryptography involves the transmission of an encrypted message from one party to another. The message is encrypted using a mathematical function known as a cryptographic algorithm, which for security reasons allows for a large number of initial settings, the selection being determined by a cryptographic "key." The cryptographic algorithm must be complex enough so that an encrypted message cannot be decrypted by an unauthorized party if the cryptographic algorithm is known but the key is not. If both the key and the algorithm are known by an unauthorized party then the unauthorized party may decrypt the encrypted message. Typically, the algorithm is known to all, but the key is known only by the intended recipients. Consequently, the security of the encrypted message lies in maintaining the secrecy of the key.

An uncrypted message, i.e., plaintext, is encrypted, i.e., converted to ciphertext, by a sender by using a cryptographic system to mathematically alter the plaintext using a cryptographic algorithm and a key. An intended recipient recovers the plaintext by mathematically altering the ciphertext using a crypto-algorithm and a key in a manner that is the mathematical inverse of the mathematical function performed by the sender.

Modern cryptographic systems fall into two categories: symmetric-key crypto-systems and public-key crypto-systems. A symmetric-key crypto-system is one wherein the encryption key and decryption key are computable from one another (the keys acre often the same), so that an agreed upon secret must be established off-line before secure communication can take place. A public-key crypto-system is one in which the decryption key cannot feasiblely be computed from the encryption key, so that the encryption key can be made public without compromising the security of the system. Having two different keys for encryption and decryption, where knowledge of the encryption keys does not betray the decryption key, solves a problem that exists in a symmetric-key system, i.e., key distribution, and enables the parties to perform additional functions, e.g., electronic key exchange, non-repudiation and message authentication., Secure data transmission involves controlling access to the data being transmitted. Current approaches to implementing a secure transmission utilize software/device drivers at both ends of the data transmission, i.e., sender and recipient, to encrypt and decrypt the data transmission. These approaches, however, require that the same encryption methodology be employed to ensure that they are all 100% compatible in their implementation. Additionally, a substantial performance penalty is introduced since additional software processing of the data transmission is required.

Accordingly, what is needed in the art is an improved secure data transmission scheme that mitigates the above described limitations.

SUMMARY OF THE INVENTION

It is therefore an object of the present invention to provide improved data communications.

It is another object of the present invention to provide a circuit for providing secure communication over a data communication interconnect and a method of operation thereof.

To achieve the foregoing objects, and in accordance with the invention as embodied and broadly described herein a secure communication circuit for use with a data communication interconnect adapter is disclosed. The secure communication circuit includes a first data buffer coupled to a data input terminal, an encoder/decoder coupled to the first data buffer, a second data buffer coupled to the encoder/decoder and a switching device coupled to a data output terminal. The switching device is couplable to either the first or second data buffers. A controller, coupled to the switching device, selectively connects the switching device to the first or second data buffers. In a related embodiment, the secure communication circuit further includes a first serializer/deserializer (SERDES) coupled to the data input and a second SERDES coupled to the switching device.

The present invention introduces a novel secure communication circuit that provides a more time efficient methodology for encrypting and decrypting data transmissions. The present invention accomplishes this by implementing the encryption and decryption scheme in the secure communication circuit, preferably in hardware external to the sending and receiving devices. The hardware implementation reduces significantly or eliminates the performance degradation, encountered by currently employed software implementations.

In one embodiment of the present invention, the data communication interconnect adapter is a Fibre Channel node. It should be noted that in other advantageous embodiments, the data communication interconnect adapters are those employed with other interconnect technologies, such as gigabit ethernet and asynchronous transfer mode (ATM) technologies. The present invention does not contemplate limiting its practice to any one specific interconnect technology.

In another embodiment, the first SERDES is coupled to a transmit port of the Fibre Channel node. This is the case where the Fibre Channel node is attached to a device that is originating a data transmission. In a related embodiment, the second SERDES is coupled to a receive port of the Fibre Channel node wherein the attached device is the destination of the data transmission.

In yet another embodiment, the encoder/decoder utilizes a Data Encryption Standard (DES) algorithm. Those skilled in the art should readily appreciate that other encrytion algorithms employing symmetric or public keys may also be advantageously utilize,d in the practice of the present invention.

In another embodiment of the present invention the first and second data buffers are implemented utilizing registers. Additionally, in a related embodiment, the controller is a state machine.

The foregoing description has outlined, rather broadly, preferred and alternative features of the present invention so that those skilled in the art may better understand the detailed description of the invention that follows. Additional features of the invention will be described hereinafter that form the subject matter of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
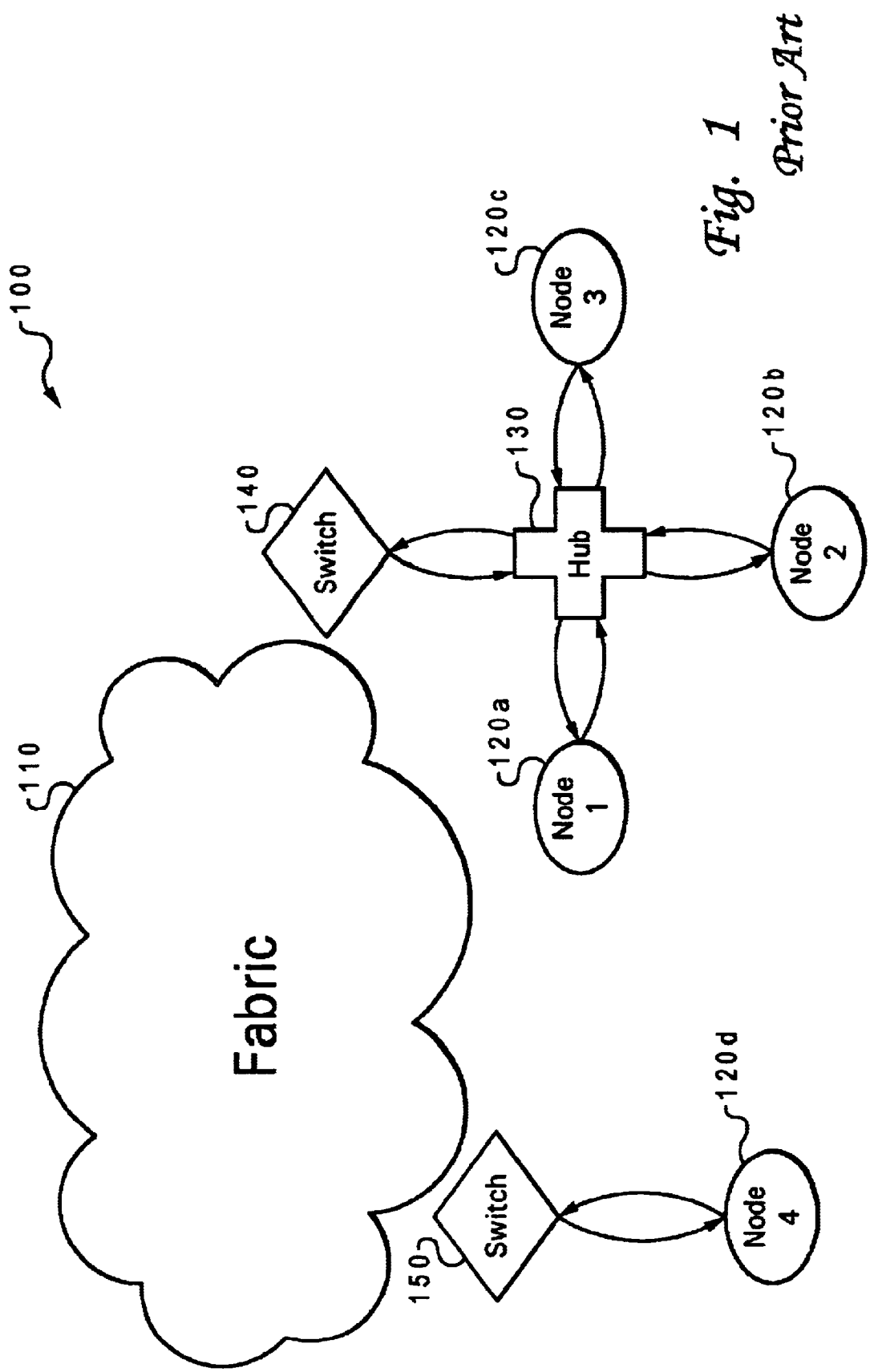
FIG. 1 illustrates an exemplary Fibre Channel distributed system, wherein data is transmitted and received through a public fabric, that provides a suitable environment for the practice of the present invention.

With reference now to the figures and in particular, with reference to FIG. 1, there is depicted an exemplary Fibre Channel distributed system 100, wherein data is transmitted and received through a public fabric 110, that provides a suitable environment for the practice of the present invention. Although the present invention will be hereinafter described in the context of a Fibre Channel distributed system, those skilled in the art should readily appreciate that the present invention may, in other advantageous embodiments, be employed in network, or distributed, systems utilizing different data communication interconnect technologies, e.g., gigabit ethernet and asynchronous transfer mode (ATM) technologies.

Fibre channel system 100 includes first, second and third nodes 12a, 120b, 120c, such as computer workstations, personal computers, servers and data storage RAID devices, coupled to a hub 130. Hub 130 is a conventional fibre channel hub that is typically utilized to connect nodes in a loop. Logically, hub 130 is similar to a Token Ring hub with "ring in" and "ring out." Each port (not shown) on hub 130 contains a port bypass circuit that automatically open and closes the loop. Hub 130 also supports hot insertion and removal of devices from the loop and if an attached node is not operational, hub 130 will detect and bypass the node. Generally, a hub may have seven to ten ports and can be stacked to a maximum loop size of, e.g., 127 ports.

A first switch 140 is also shown coupling hub 130 to a fibre channel fabric 110. Also shown in the illustrated embodiment, is a fourth node 120d that is coupled to fabic 110 via a second switch 150. Fabric 110 may be as simple as a single cable connecting two devices, such as first and second switches 140, 150, or as complex as a large number of fibre channel switches incorporating both circuit and packet switching that can connect up to sixteen million devices. A device attached to fabric 110 can transmit and receive data to and from any other device attached to fabric 110. Fabric 110 generally utilizes circuit switching much like a conventional telephone network and creates multiple, temporary and direct connections, each of which can provide full bandwidth. Furthermore, each connection can utilize the full bandwidth so that congestion, by adding more workstations and peripheral devices, can be avoided. Additionally, the bandwidth of the system may be further expanded by adding more paths. Fabric 110 internal hardware, e.g., bridges and routers, (not shown) routes data transmissions between first, second or third nodes 12a, 120b, 120c to fourth node 120d by quering fourth node 120d availablity. If fourth device 120d responds that it is available, fabric 110 confirms the route back to the sending node. In the event that the connection fails, fabric 110 re-routes the transmission via another connection path.

Figure 2:
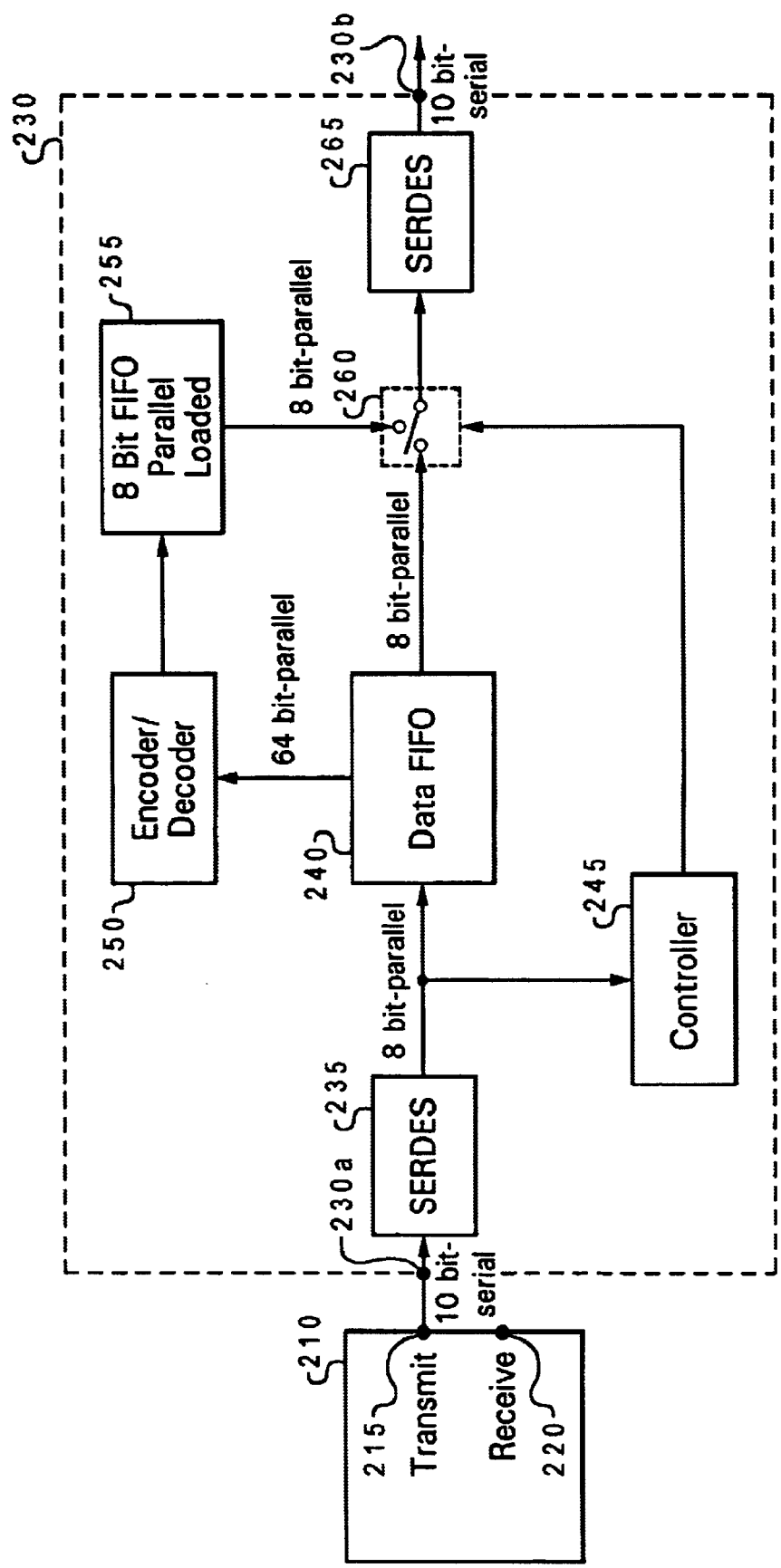
FIG. 2 illustrates a block diagram of an embodiment of a secure communication circuit constructed according to the principles of the present invention coupled to a conventional fibre channel node.

Referring now to FIG. 2, there is illustrated a block diagram of an embodiment of a secure communication circuit 230 constructed according to the principles of the present invention coupled to a conventional fibre channel node 210. Fibre channel node 210 (analogous to nodes 12a–120d depicted in FIG. 1) includes a transmit port 215 and a receive port 220. The data communication interconnect adapter, i.e., node 210, is typically coupled to a data storage device or a workstation and provides the "link" to a fabric node (not shown), e.g., fibre channel switch, that serves as a gateway to a network fabric (analogous to fabric 110 illustrated in FIG. 1). Node 210 is utilized to manage the simple point-to-point connection between itself and the network fabric. With respect to data transmission and reception, node 210 transmits data frames in 10 bit-serial format at transmit port 215 and receives data frames in 10 bit-serial format at receive port 220.

Secure communication circuit 230 includes a first serializer/deserializer (SERDES) 235 and, as its name suggests, converts the 10 bit-serial, formatted data frames received at input terminal 23a into 8 bit-parallel data blocks. Secure communication circuit 230 also includes a data buffer 240 and a controller 245, coupled to first SERDES 235, that receive the converted 8 bit-parallel data blocks. Data buffer 240, in an advantageous embodiment, is implemented utilizing a conventional register and stores the incoming data frames in a first in first out (FIFO) manner. Controller 245, in a preferred embodiment, is a state machine that examines the incoming data frames to generate a control signal to control the operation of a switching device 260 in secure communication circuit 230.

Secure communication circuit 230 further includes a encoder/decoder 250 coupled to a second data buffer 255. Encoder/decoder 250 is further coupled to first data buffer 240 and receives the data frames, stored in first data buffer 240 in 64 bit-parallel data blocks. In the configuration depicted in the illustrated embodiment, a conventional data encryption standard (DES) encoder/decoder 250 encodes the data frames utilizing a DES algorithm. It should be readily apparent to those skilled in the art that other encryption algorithms may also be advantageously employed in place of the DES algorithm. The symmetric DES algorithm typically has a 64 bit block size and utilizes a 56 bit key during execution. It should be noted that size of the data blocks provided to encoder/decoder 250 from first data buffer 240 is on the specific type of encoder/decoder unit utilized and/or the encryption algorithm employed. Thus, for example, first buffer 240 may generate 128 bit-parallel data blocks if the encoder/decoder unit requires a larger size input. Second data buffer 255, a conventional register, receives and stores the encoded 64 bit data blocks in a FIFO manner. The ,data stored in second buffer 255 are released out in 8 bit-parallel data blocks to switching device 260. A second SERDES 265 in secure communication circuit 230 is coupled to switching device 260 and, depending on the condition of switching device 260, is selectively coupled to either first or second data buffers 240, 255. Second SERDES 265 is utilized to convert the 8 bit-parallel data blocks from either first or second data buffers into 10 bit-serial data blocks that, in turn, are forwarded on to a fabric node (not shown) via an output terminal 230b for transmission to a recipient(s) connected to the network fabric. It should be noted that the recipient of the encoded transmission should also be similarly equipped with a secure communication circuit to decode the encoded data transmission.

In the case where a second device l(not shown), e.g., data storage device or personal computer, attached to a fibre channel node coupled to the network fabric is the intended recipient of the above discussed encoded data transmission, a second secure communication circuit is employed to decode the encoded data transmission. The secure communication circuit 230 is configured at the fibre channel node attached to the second device wherein second SERDES 265 is connected to a receive port (analogous to receive port 220) of the receipient fibre channel node and first SERDES 235 is connected to a fabric node connected to the fabric network. !The operation of secure communication circuit 230 will be described in greater detail hereinafter with respect to FIGS. 3 and 4, with continuing reference to FIG. 2, wherein encoding a data transmission and decoding an encoded data transmission are described, respectively.

Figure 3:
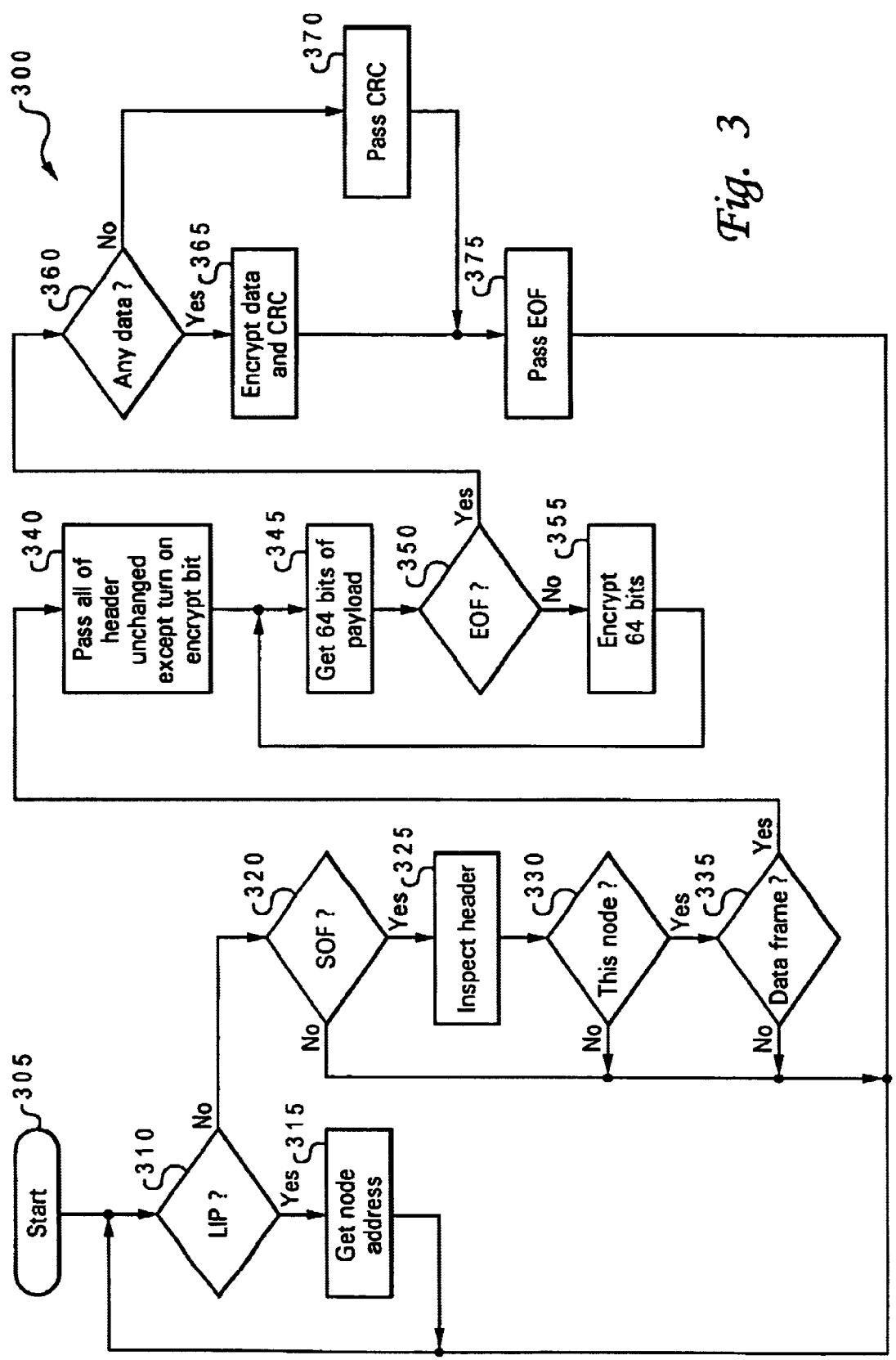
FIG. 3 illustrates an embodiment; of a process flow for encoding a data transmission according to the principles disclosed by the present invention.

Referring now to FIG. 3, there is depicted an embodiment of a process flow 300 for encoding a data transmission according to the principles disclosed by the present invention. Process flow 300 is initiated, as depicted in step 305, when a data transmission is detected at secure communication circuit 230. Following the detection of the transmission, process, 300 determines if it is a loop initialization protocol signal as illustrated in decisional step 310. It should be noted that when the loop is idle and a device at one node wants to communicate with another device at another node, a loop arbitration protocol is typically performed. When arbitration is won by any loop node port, all the intermediate loop ports act as repeaters for the data transmission. In the event that decisional step 310 determines that a loop initialization protocol is detected, the node address of the recipient node and all intermediate nodes (if any) are extracted, as depicted in step 315. However, if decisional step 310 determines that the data is not part of a loop initialization protocol, control passes to decisional step 320, wherein it is determined if the data indicates the beginning of a data frame.

A frame is the smallest indivisible packet of data that can be sent through a fibre channel network. Addressing of the frame, including source and destination addresses, is typically done within the,frame header. Each frame generally includes the following fields: a start of frame delimiter; a frame header that includes an encrypt bit; optional headers; a variable length payload containing user data; a cyclic redundancy check (CRC) error check and an end-of-frame delimiter. If it is determined that it is not the start of a frame (SOF), process flow 300 reverts back to step 310. If, on the other hand, it is determined that it is a SOF, the header is inspected as depicted in step 325. The inspection of the header includes examining the source address in the header to determine if the data originated from the attached node and if the frame is a data frame, as illustrated by steps 330 and 335, respectively.

Following the determination that the the attached node is the source of the data and that the frame is indeed a data frame, the header is pass unchanged with the exception that an encrypt bit is set, i.e., turned on. In this case, controller 245 generates a control signal to position switch 260 to connect second SERDES 265 to first data buffer 240, i.e., the header information is passed through secure communication circuit 230 unencrypted. Following the passing of the frame header, controller 245 generates another control signal to position switch 260 to connect second data buffer 255 to second SERDES 265. Concurrently, first data buffer 240 is emptied and the 64 bits of payload stored in it are sent too encoder/decoder 250 as illustrated in step 345. Next, as depicted in decisional step 350, it is determined if the end-of-frame (EOF) is encountered by checking for the EOF delimiter. If it is determined that it is not yet encountered the EOF, encoder/decoder 250 encrypts the 64 bits of payload, as illustrated in step 355, and provides the encrypted payload to second data buffer 255 that, in turn, converts the 64 bit-parallel encrypted data to 8 bit-parallel data blocks. The encrypted 8 bit-parallel data blocks are then converted by second SERDES 265 to 10 bit-serial data blocks prior to forwarding the encrypted data on to the respective destination node.

After encrypting the 64 bits of payload, process 300 retrieves the next 64 bits of payload and the process of encrypting the data and retrieving the next set of 64 bits is repeated until an EOF is encountered. When an EOF is encountered, process 400 checks to see if there are any payload data that has not been encrypted, as depicted in step 360. If there are still unencrypted payload data in the frame, the CRC is combined with the unencrypted data and flushed from first data buffer 240 to encoder/decoder 250 to be encrypted. The encrypted payload data and CRC are then processed through second data buffer 255 and second SERDES 265 prior to transmission to the network fabric. However, if it is determined that there are no unencrypted payload data when the EOF is encountered, the CRC is passed unencrypted from first data buffer 240 through second SERDES 265 to the network fabric, as illustrated in step 370. In this case, controller 245 would have generated a control signal to switch 260 to connect first data buffer 240 to second SERDES 265, bypassing encoder/decoder 250. It should be noted that the EOF delimiter is also passed unencoded to the network fabric, as depicted in step 375. Following passage of the EOF delimiter, process 300 is repeated with the next frame in the data transmission.

Figure 4:
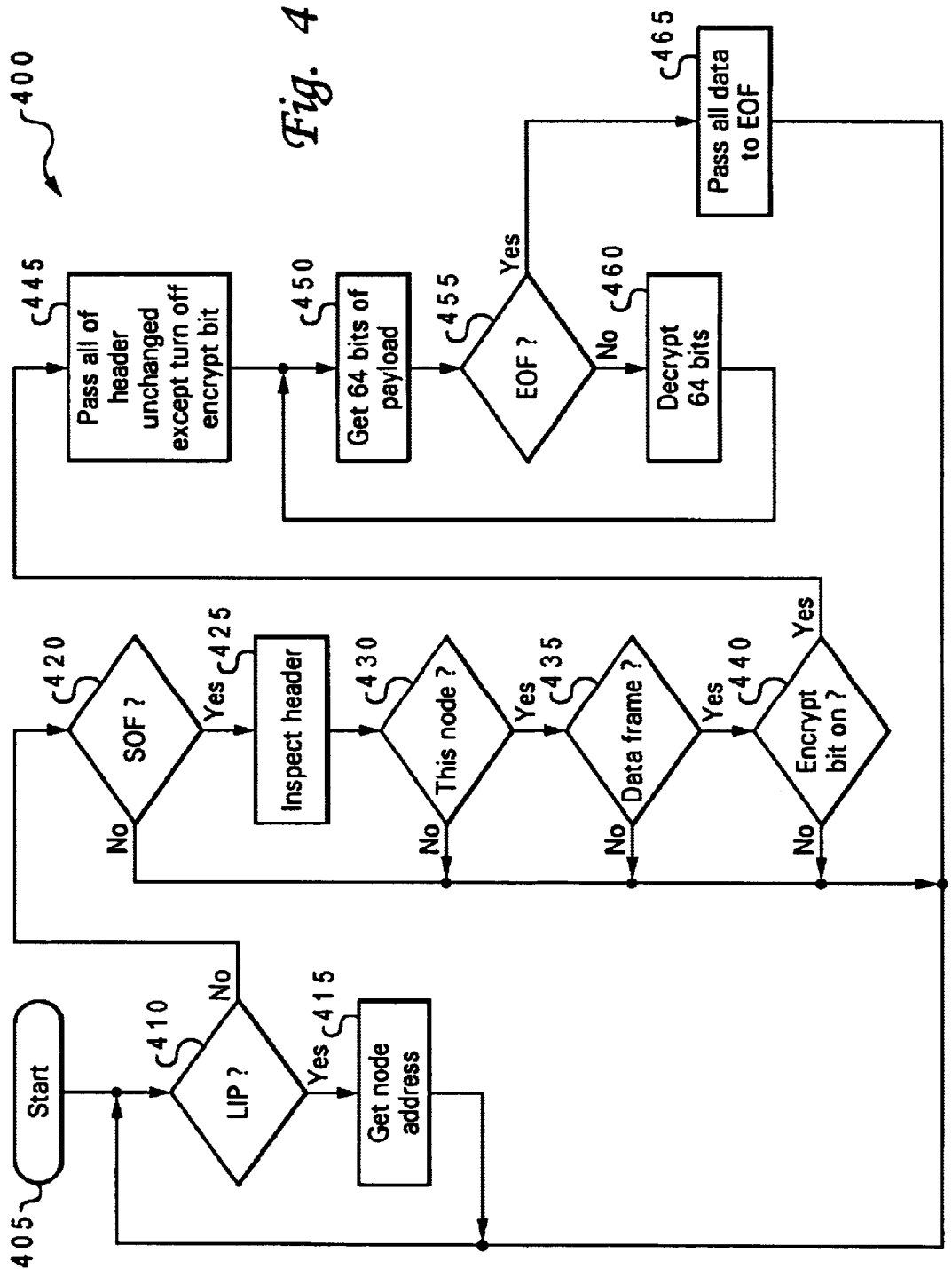
FIG. 4 illustrates an embodiment of a process flow for decoding a data transmission according to the principles disclosed by the present invention.

Referring now to FIG. 4, there is illustrated an embodiment of a process flow 400 for decoding a data transmission according to the principles disclosed by the present invention. It should be noted again that for an incoming data transmission, secure communication circuit 230 is configured wherein second SERDES 265 is connected to receive port 220 and first SERDES 235 is connected to the network fabric. Process flow 400 his initiated when a data transmission is detected, as depicted in step 405. As with process 300, determination of a loop initialization protocol and acquiring node addresses are next acomplished, as illustrated in steps 410 and 415. Next, as depicted in step 420, the incoming data is examined to determine if it indicates the start of a data frame (SOF). If it is determined that it is not the start of a frame (SOF), process flow 400 reverts back to step 410. If, on the other hand, it is determined that it is a SOF, the header is inspected as depicted in step 425. The inspection of the header includes examining the destination address in the header to determine if the data destination is the attached node, if the frame is a data frame and is the encrypt bit set, as illustrated by steps 430, 435 and 440, respectively.

Following the determination that the attached node is the destination of the data transmission, that the frame is indeed a data frame and the encryption bit is set, the header is then passed unchanged with the exception that the encrypt bit is now turned off. This is accomplished by controller 245 generating a control signal to switch 260 to connect first data buffer 240 to second SERDES 265, bypassing encoder/decoder 250. Following the passing of the frame header, controller 245 generates another control signal to position switch 260 to connect second data buffer 255 to second SERDES 265. Concurrently, first data buffer 240 is flushed of its contents and the 64 bits of payload stored in it are sent to encoder/decoder 250 as illustrated in step 450. Next, as depicted in decisional step 455, it is determined if the end-of-frame (EOF) is encountered by checking for the EOF delimiter. If it is determined that it is not at the EOF, encoder/decoder 250 decrypts the 64 bits of payload, as illustrated in step 460, and provides the decrypted payload to second data buffer 255 that, in turn, converts the 64 bit-parallel decrypted data to 8 bit-parallel data blocks. The decrypted 8 bit-parallel data blocks are then converted by second SERDES 265 to 10 bit-serial data blocks prior to the decrypted data on to the respective destination node.

After decrypting the 64 bits of payload, process 400 retrieves the next 64 bits of payload and the process of decrypting the data and retrieving the next set of 64 bits of payload is repeated until such time as when an EOF is encountered. When an EOF is encountered, as depicted in step 465, controller 245 re-positions switch 260 to bypass encoder/decoder 250 to pass all the remaining data to the destination node. Following passage of the EOF, process 400 is repeated with the next frame.

In another advantageous embodiment, the secure communication circuit may be implemented in a computer system programmed to execute the method described herein. Accordingly, in an advantageous embodiment, sets of instructions for executing the method disclosed herein are resident in RAM of one or more of the computer system. Until required by the computer system, the set of instructions may be stored as computer program product in another computer memory, e.g., a disk drive. In other advantageous embodiments, the computer program product may also be stored at another computer and transmitted to a user's computer system by an internal or external communication network, e.g., LAN or WAN, respectively.

It should be noted that although the present invention has been described, in one embodiment, in the context of a computer system, those skilled in the art will readily appreciate that the present invention is also capable of being distributed as a computer program product in a variety of forms; the present invention does not contemplate limiting its practice to any particular type of signal-bearing media, i.e., computer readable medium, utilized to actually carry out the distribution. Examples of signal-bearing media includes recordable type media, such as floppy disks and hard disk drives, and transmission type media such as digital and analog communication links.

The present invention may be embodied in other specific forms without departing from fits spirit or essential characteristics. The described embodiments are to be considered in all respects as illustrative and not restrictive. The scope of the invention is, therefore, indicated by the appended claims rather than by the foregoing description. All changes which come within the meaning and range of equivalency of the claims are to be embraced within their scope.

What is claimed is:

1. A secure communication circuit for use with a data communication interconnect adapter, the secure communication circuit comprising:

a first data buffer coupled between a data input terminal and a switching device, the switching device coupled between the first data buffer and a data output terminal;

an encoder/decoder coupled between the first data buffer and a second data buffer, the second data buffer coupled between the encoder/decoder and the switching device, the first data buffer coupled between the data input terminal and the encoder/decoder, the encoder/decoder being capable of encrypting/decrypting data, wherein the data is a data frame, the data frame including a frame header, the frame header including a start of frame (SOF) indicator, a source address and a destination address, and a cyclic redundancy check (CRC) data, the data frame also including a payload data and an end of frame (EOF) determinator, and wherein only the data frame is the secure communication, such that the frame header and EOF determinator are transmitted without encoding, and the payload data is transmitted encoded; and a controller, coupled to the switching device, that selectively connects the switching device to the first or second data buffers, such that the switching device, under the direction of the controller, passes unencrypted data directly from the first data buffer to the data output terminal, and the switching device passes encrypted data from the second data buffer to the data output terminal.

2. The secure communication circuit as recited in claim 1 further comprising:

a first serializer/deserializer (SERDES) coupled between the data input and the first data buffer; and a second SERDES coupled between the switching device and the data output terminal.

3. The secure communication circuit as recited in claim 2 wherein said data communication interconnect adapter is a Fibre Channel node.

4. The secure communication circuit as recited in claim 3 wherein the second SERDES is coupled between a receive port of said Fibre Channel node and the switching device.

5. The secure communication circuit as recited in claim 1 wherein said encoder/decoder utilizes a Data Encryption Standard (DES) algorithm.

6. The secure communication circuit as recited in claim 1 wherein said first and second data buffers are implemented utilizing registers.

7. The secure communication circuit as recited in claim 1 wherein said controller is a state machine.

8. The secure communication circuit of claim 1, wherein the CRC data is also encoded with the payload data if the EOF determinator is read by the controller before all of the payload data is encoded.

9. The secure communication circuit of claim 8, wherein the payload data encoded with the CRC data is up to 32 bits of data, which are encoded together with a 32-bit CRC data.

10. A method for providing secure communication over data communication interconnects, the method comprising the steps of:

storing received data in a first data buffer;

encrypting said received data and storing said encrypted data in a second data buffer;

determining if said received data is a secure communication; and selectively coupling, in response to said determination that received data is a secure communication, a data output terminal to said second data buffer, otherwise coupling said data output terminal to said first data buffer, wherein the received data is a data frame, the data frame including a frame header, the frame header including a start of frame (SOF) indicator, a source address and a destination address, and a cyclic redundancy check (CRC) data, the data frame also including a payload data and an end of frame (EOF) determinator, and wherein only the data frame is the secure communication, such that the frame header and EOF determinator are transmitted without encoding, and the payload data is transmitted encoded.

11. The method as recited in claim 10 wherein said step of storing includes the step of deserializing said received data.

12. The method as recited in claim 10 wherein said step of selectively coupling includes the step of serializing an output data stream.

13. The method as recited in claim 10 wherein said step of determining includes the step of examining a data frame to determine if an encrypt bit in said data frame is set.

14. The method as recited in claim 10 wherein said step of encoding/decoding said received data includes the step of utilizing a Data Encryption Standard (DES) algorithm.

15. The method as recited in claim 14 wherein said step of encoding/decoding said received data further includes the step of encoding said received data in 64 bits data blocks.

16. The method of claim 10, wherein the CRC data is also encoded with the payload data if the EOF determinator is read by the controller before all of the payload data is encoded.

17. The method of claim 16, wherein the payload data encoded with the CRC data is up to 32 bits of data, which are encoded together with a 32-bit CRC data.

18. A computer program product, comprising:

a computer readable medium having stored thereon computer executable instructions for implementing a method for providing secure communication over data communication interconnects, said computer executable instructions when executed, perform the steps of:

storing received data in a first data buffer;

encrypting said received data and storing said encrypted data in a second data buffer;

determining if said received data is a secure communication; and selectively coupling, in response to said determination that received data is a secure communication, a data output terminal to said second data buffer, otherwise coupling said data output terminal to said first data buffer, wherein the data is a data frame, the data frame including a frame header, the frame header including a start of frame (SOF) indicator, a source address and a destination address, and a cyclic redundancy check (CRC) data, the data frame also including a payload data and an end of frame (EOF) determinator, and wherein only the data frame is the secure communication, such that the frame header and EOF determinator are transmitted without encoding, and the payload data is transmitted encoded.

19. The computer program product as recited in claim 18 wherein said step of storing includes the step of deserializing said received data.

20. The computer program product as recited in claim 18 herein said step of selectively coupling includes the step of serializing an output data stream.

21. The computer program product as recited in claim 18 wherein said step of determining includes the step of examining a data frame to determine if an encrypt bit in said data frame is set.

22. The computer program product as recited in claim 18 wherein said step of encoding/decoding said received data includes the step of utilizing a Data Encryption Standard (DES) algorithm.

* * * * *